C. E. DERR.
MACHINE FOR CUTTING TEETH.
APPLICATION FILED DEC. 20, 1915.

1,374,064.

Patented Apr. 5, 1921.
6 SHEETS—SHEET 1.

Witness:
E. R. Barrett.

Inventor:
Charles E. Derr,
By Millon Sibbetts
Attorney.

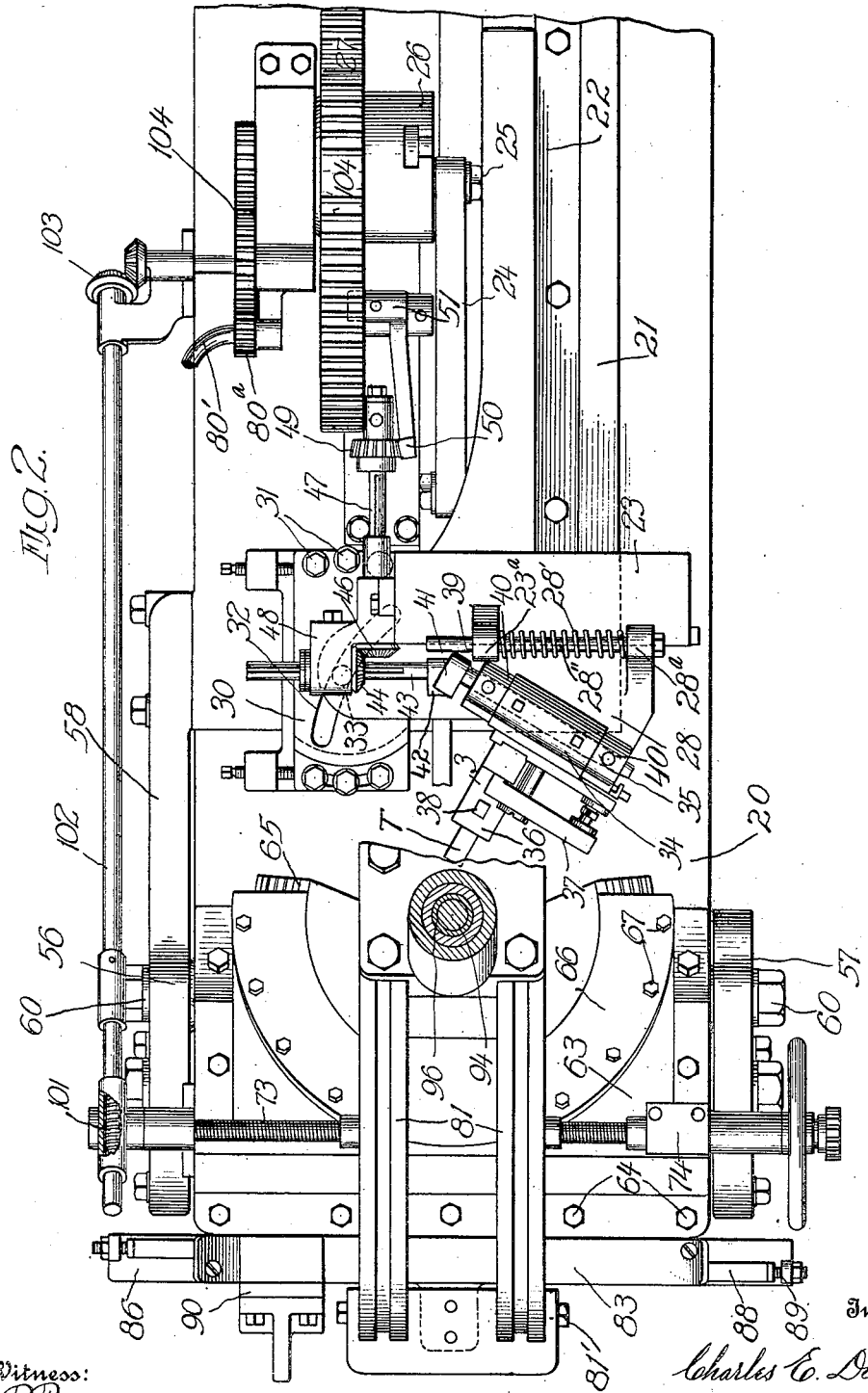

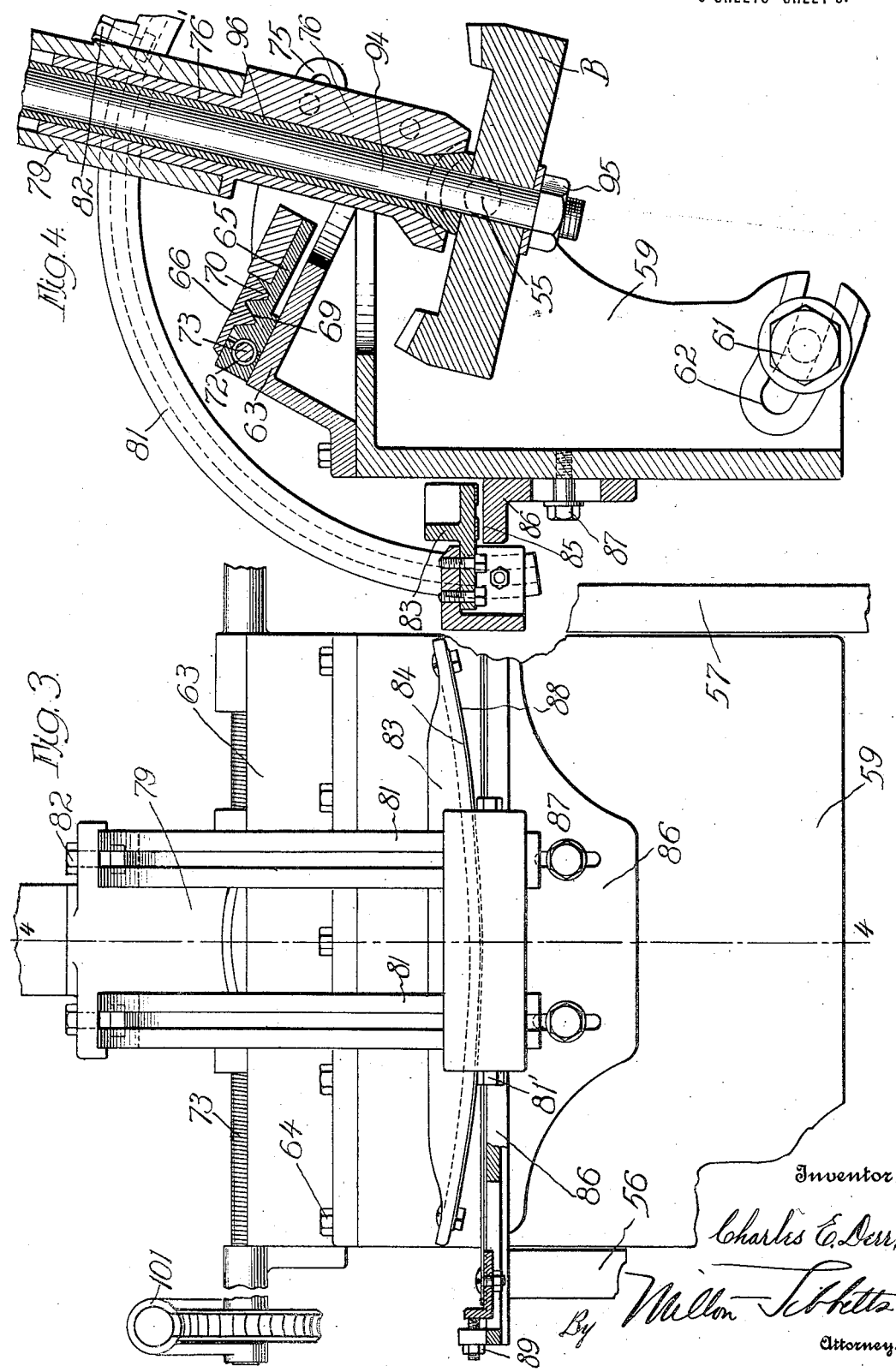

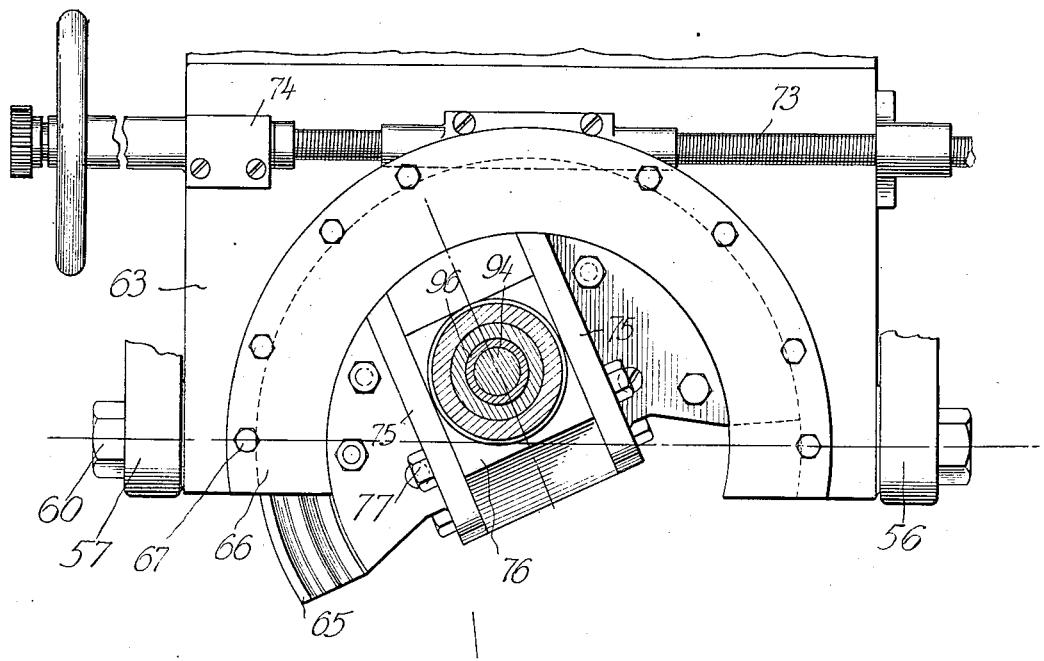
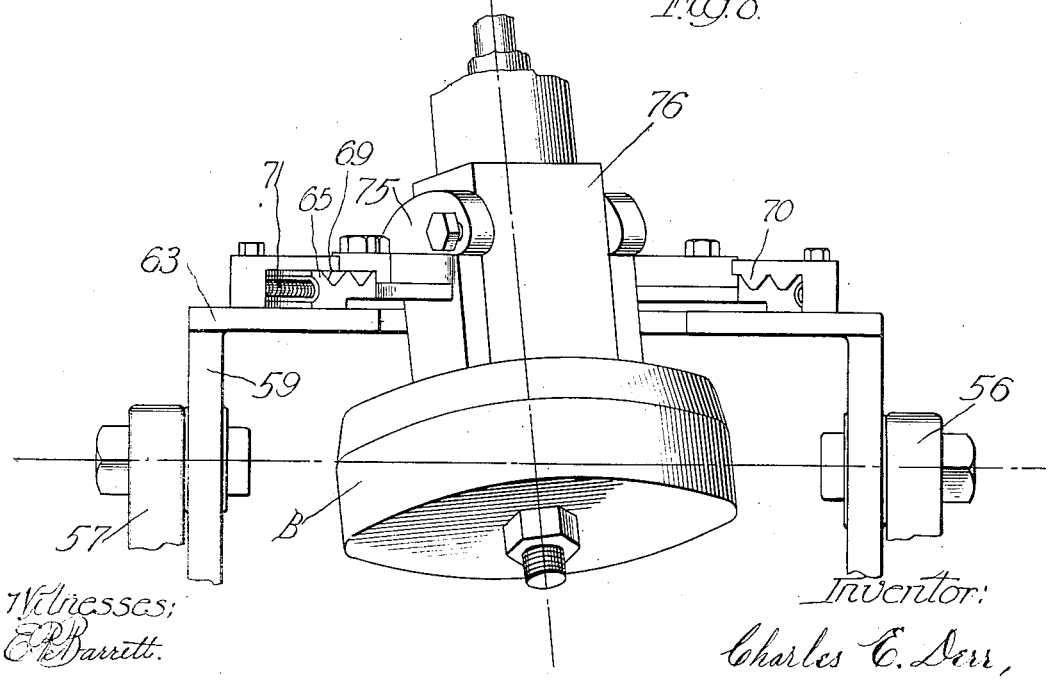

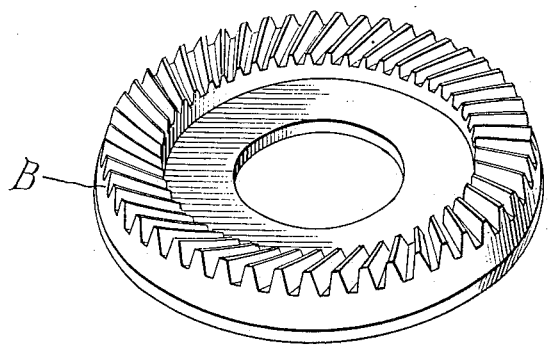
Fig. 9
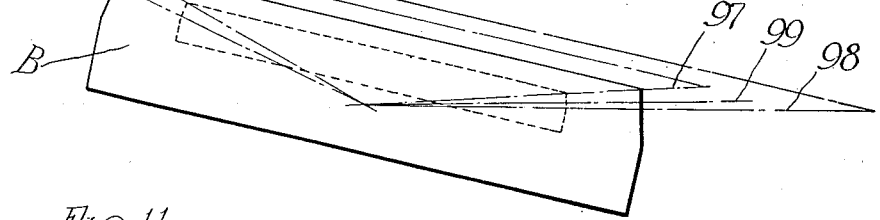
Fig. 10
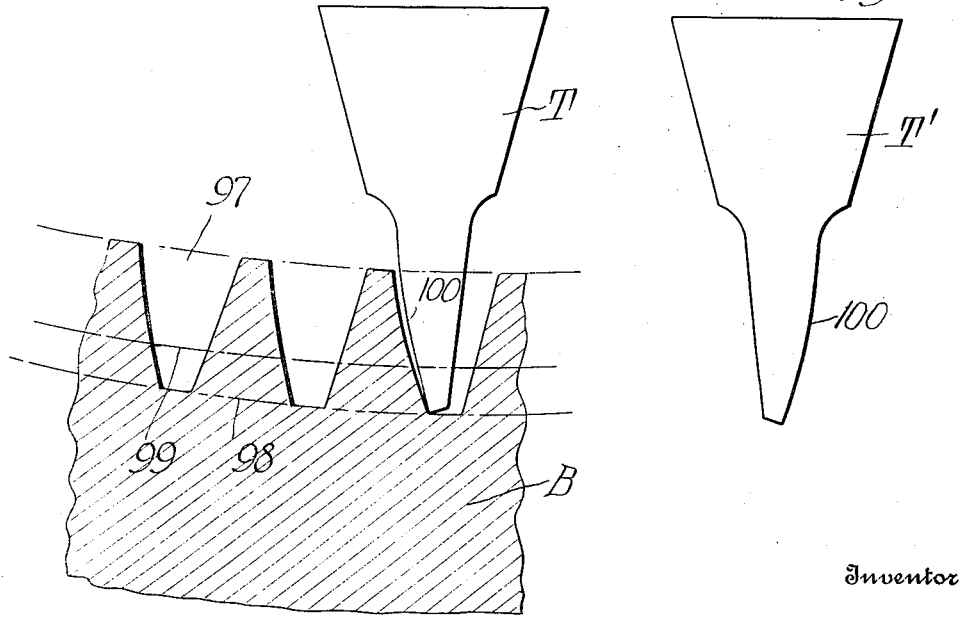
Fig. 11
Fig. 12

UNITED STATES PATENT OFFICE.

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

MACHINE FOR CUTTING TEETH.

1,374,064.  Specification of Letters Patent.  Patented Apr. 5, 1921.

Application filed December 20, 1915. Serial No. 67,859.

*To all whom it may concern:*

Be it known that I, CHARLES E. DERR, a citizen of the United States, and resident of Detroit, Wayne county, State of Michigan, have invented certain new and useful Improvements in Machines for Cutting Teeth, of which the following is a specification.

This invention relates to machines for cutting teeth, and particularly teeth of bevel gear dies or matrices.

The invention is adapted to a wide variety of applications and the form in which it is shown herein is to be understood as illustrative only of the principles involved in embodying the invention in a working machine.

The invention is shown as applied to the making of dies for drop forging or pressing bevel gears having generated or involute teeth, such as the gears used in the final drive of motor vehicle axles. In such gears there is usually a three- or four-to-one reduction so that the pinion of the pair is comparatively much smaller than the gear, the latter being very nearly a circular rack. Were it a circular rack and involute teeth employed obviously the teeth of the gear would be rack teeth, that is, each side or face of a tooth would be straight in cross section. However, since the gear is slightly beveled, each tooth face is slightly convex in cross section to properly conform to or be conjugate with the pinion. In making a die therefore, that will be a perfect matrix for such a gear the teeth of the die will conform to the spaces between the teeth of the gear and the faces of the teeth of the die will consequently be slightly concave in cross section. The particular dies shown have the teeth tangentially arranged and curved in the direction of their length, and the machine is particularly adapted for cutting such teeth, but the machine may be used for cutting dies for other gears also.

One of the objects of the invention is to provide means for cutting the teeth of bevel gear dies or matrices such as are described above.

In the machine which forms the subject matter of this application means are provided for operating the cutter parallel to a given plane, preferably a horizontal plane, and the die or matrix blank is so held and operated relative to the cutter that an element of the dedendum cone of the blank is substantially coincident with said plane. This permits the cutter to operate across the face of the blank, in a curved path if desired, but substantially in the plane referred to so that its deepest cut is made along the surface of the dedendum cone. It will be understood that the dedendum cone of a bevel gear die, being at the base of the teeth of course, marks the boundary, inwardly of the blank, of the cut part of the blank, that is, the teeth are outwardly of the blank from the dedendum cone but are inside of the cone itself, whereas, the teeth of a bevel gear are entirely outside of its dedendum cone, and therefore, it may be said that in the present machine the point of the cutter when it is making its deepest cut, which of course is along the line of the dedendum cone, operates substantially in a plane clear of all other cut portions of the blank.

For the purpose of providing proper clearance for the tool and of giving to the faces of the die teeth a concave surface in cross section, a tool or cutter having a convex cutting edge is employed, and means are provided also for relatively moving the cutter and blank so that the desired concave surface throughout the length of the tooth will be produced.

Other objects and advantages of the invention will appear from the following detail description taken in connection with the drawings, which form a part of this specification, and in which:

Fig. 2 is a plan view of the machine shown in Fig. 1, parts being broken away;

Fig. 3 is a view of one end of the machine shown in Figs. 1 and 2, some parts being shown in section;

Fig. 4 is a vertical section on the line 4—4 of Fig. 3;

Fig. 7 is approximately a plan view of the blank supporting plate and adjacent parts, being taken on a plane parallel to the supporting surface of said plate;

Fig. 8 is substantially a vertical view, being taken in a plane at right angles to that of Fig. 7, and shows in elevation the parts of the machine illustrated in Fig. 7;

Fig. 9 is a perspective view of a die cut on the machine forming the subject matter of this invention;

Fig. 10 is a diagrammatic edge view of the blank upon which the machine operates;

Fig. 11 is an enlarged view showing the cutting tool in end elevation, and illustrating in section a fragment of the blank upon which the cutter operates; and Fig. 12 is a front end view of a cutter similar to that shown in Fig. 11, but with an opposite cutting edge.

Figure 1:
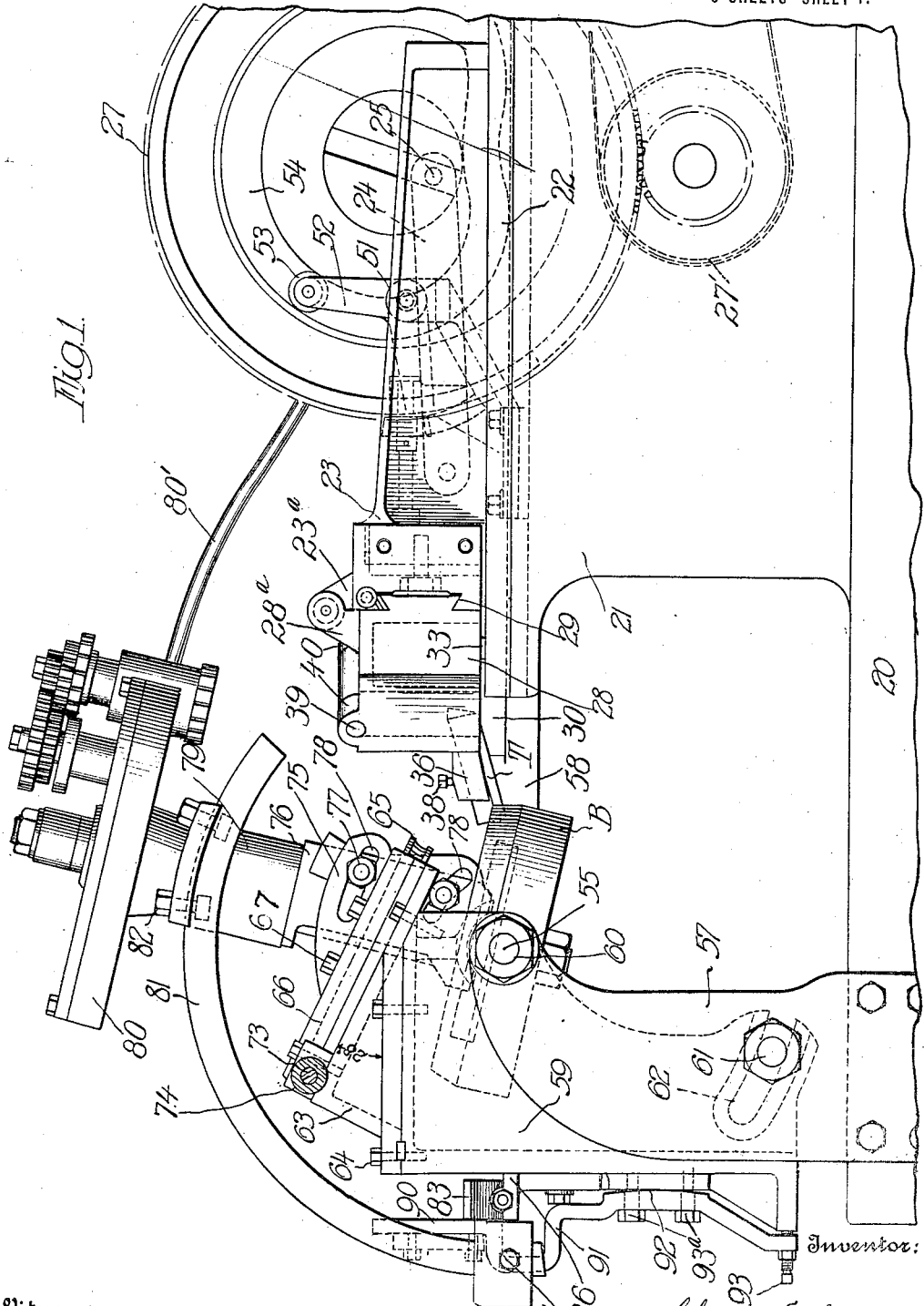
Figure 1 is a side elevation of a machine embodying this invention.
Figure 5:
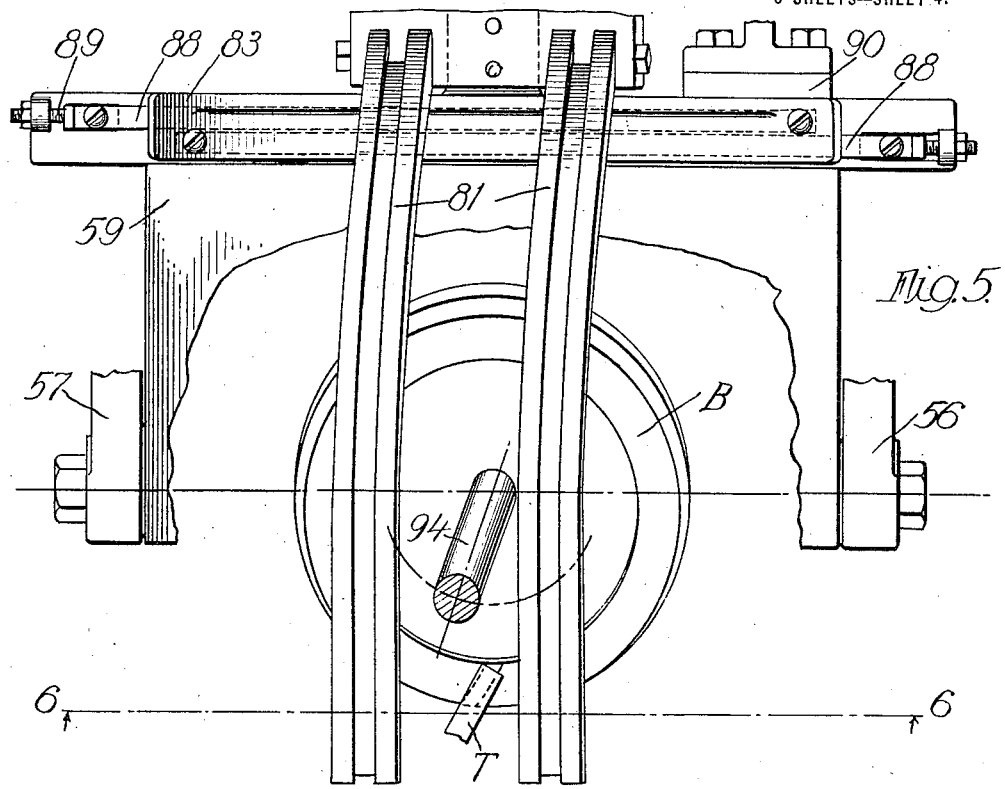
Fig. 5 is a plan view of the end of the machine shown in Figs. 3 and 4, with the parts shown in different positions.
Figure 6:
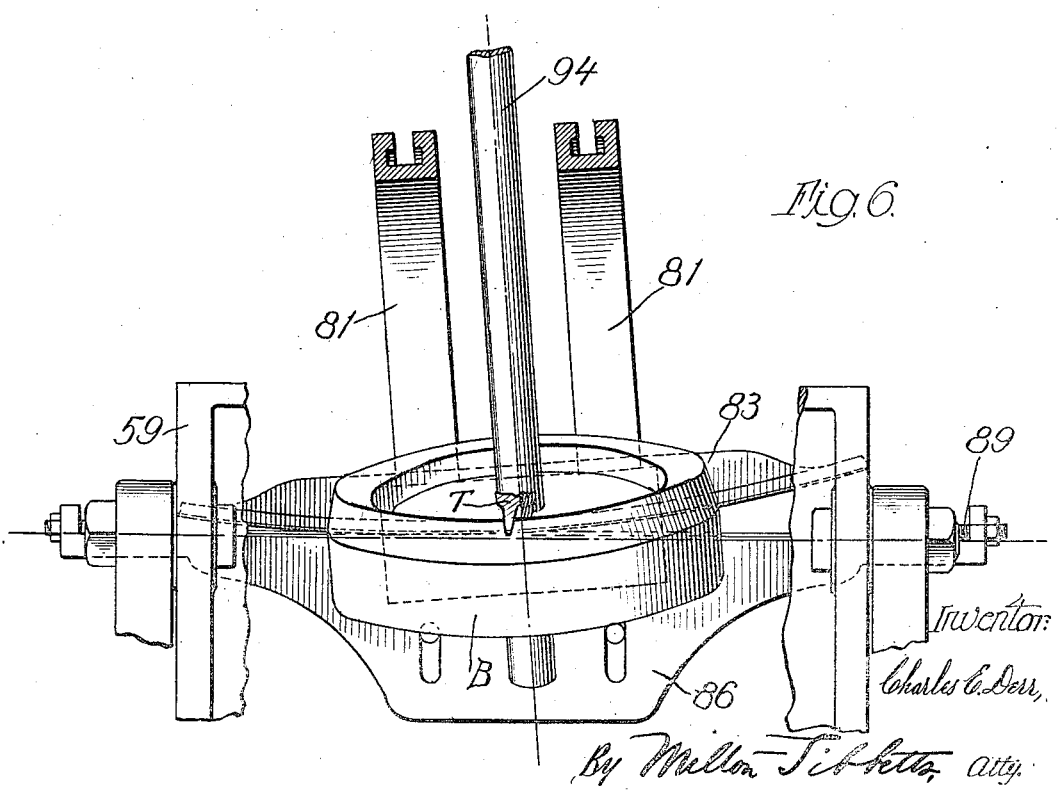
Fig. 6 is a vertical sectional view approximately on the line 6—6 of Fig. 5, parts being cut away.

Referring to the drawings, 20 represents the base of the machine, one end of which is in the form of a table 21, having a slideway 22, for a ram 23, which is adapted to move back and forth in the slideway to operate the cutting tool of the machine. This reciprocation of the ram is produced by a connecting rod 24 operated by an eccentric pin 25 adjustably mounted in a boss 26 of a rotating wheel 27. Said wheel may be operated by any suitable power mechanism as the pulley 27', geared to it as shown in Fig. 1.

Upon the front face of the ram 23 is mounted a tool carrier 28, said carrier having a dove-tail sliding connection 29 with the ram. A cam plate 30 adjustably fixed upon the table 21 as by the bolts 31 has an arc-shaped cam groove 32 which guides the carrier 28 and moves it transversely of the ram 23 as the latter is reciprocated. For this purpose, the carrier 28 has a downwardly extending pin 33, which operates in the cam slot 32. A spring 28' on the rod 28'' is compressed between a lug 28$^a$ on the carrier 28 and a lug 23$^a$ on the ram 23, to maintain the pin 33 constantly against one side of the cam slot.

Upon the front face of the carrier 28 is an apron 34, pivotally mounted as at 35, and having a tool holder 36 secured upon its front face. This tool holder 36 may be detachably secured to the apron 34 as by a clamp 37 of any desired construction. The tool T is held in the tool holder 36 as by a clamping bolt 38. It will be seen that the long axis of the tool T extends in the general direction of the cam slot 32, which of course is the general direction in which the tool T is moved by the combined forward and lateral movement of the carrier 28.

It will be understood that the tool T is to be operated in a forward direction for making the cut, and that it travels idly rearwardly. Therefore, if the blank holding mechanism, hereinafter described, should be provided with means for indexing the blank around for each cutting movement of the tool, the latter should be provided with means for raising it on the rearward stroke, so that it would entirely clear the blank on that stroke. In the machine shown herein, such tool lifting means is provided. As above stated, the apron 34 is pivoted at 35 by a short shaft 39 operating in ears 40 on the carrier 28, and the projecting end of the shaft 39 has an arm 41 which may be operated by a cam 42 on a shaft 43, which has a sliding keyed connection with a bevel gear 44, in mesh with the corresponding gear 46, slidingly keyed upon a shaft 47. The gears 44 and 46 are mounted in a suitable bracket 48 upon the ram 23, and the shaft 47 is adapted to be oscillated or rocked by means of a bevel pinion 49 and a segmental bevel gear 50, which latter is pivoted at 51 and operated by an arm 52 having a roller 53 operating in a cam slot 54 in the wheel 27, above referred to. The cam slot 54 is so formed as to properly synchronize with the indexing of the blank, and raise the tool T from its normal operative position upon the backward stroke of the tool.

About the geometric center 55 of the machine and at the left hand end thereof in Figs. 1 and 2, is grouped the mechanism for supporting, rocking and indexing the blank B. This mechanism is shown as mounted upon a pair of arms 56, 57 on opposite sides of the base 20 at the left hand end thereof. At the upper end, one or both of these arms 56, 57 may be rigidly connected to the table 21 by a tie bar 58, for the purpose of giving strength and rigidity to the frame.

Upon a horizontal transverse axis passing through the geometric center 55 above referred to is swung the cradle 59 upon which the blank holding and operating mechanism proper is mounted. The trunnions 60 for the cradle 59 are particularly shown in Figs. 1 and 2, and bolts 61 in the supports 56 and 57 are adapted to operate in slots 62 in the cradle 59, and secure the cradle in its adjusted position. This construction will be clear from an examination of Figs. 1 and 4, where the slot 62 in the lower part of the cradle 59 is shown.

For mounting a blank supporting plate 65 upon the cradle 59 a bracket 63 may be provided, being detachably secured to the cradle as by bolts 64. As shown, the particular bracket 63 is non-adjustable and has its upper face set at an angle to the cradle surface, being in a plane approximately 28 degrees from the horizontal.

A blank supporting plate 65 is mounted upon the upper plane surface of the angle plate 63 and is held between said angle plate 63 and a retainer plate 66, which is secured to angle plate 63 as by bolts 67. As shown particularly in Figs. 4, 7 and 8, the supporting plate 65 is provided with a series of grooves 69 and the plate 66 has a series of ribs 70 which operate in said grooves 69, and said ribs and grooves are of segmental form, being arranged about an axis passing through the geometric center 55 of the machine. The periphery of the plate 65 is formed with worm gear teeth 71, with which meshes a worm 72 on a shaft 73, mounted in bearings 74 on the angle plate 63.

The plate 65 is formed with a pair of separated vertically arranged arms 75 between which is adjustably held a block or bearing member 76, the adjustment being secured by bolts and nuts 77 which operate in slots 78 of arcual form, said arcs being struck from the geometric center of the machine above referred to.

An upward extension 76' of the block 76 forms a bearing support for a cylindrical block 79 upon which a housing 80 is mounted. Any suitable spacing or indexing mechanism for the blank B may be mounted in the housing 80, such as that shown in U. S. Patent No. 1,140,012, dated May 18, 1915, the principle of which is to couple the blank B to the block 79 during the forward stroke of the tool, and uncouple the blank and rotate it through the distance preferably of one tooth of the blank, during the rearward travel of the tool. A flexible shaft 80' operatively connected by a gear 80ª with a moving shaft of the machine, may be employed to operate the indexing mechanism. On the other hand, if it is desired to complete the cutting or forming of one tooth of the blank at a time, such automatic spacing or indexing mechanism may be dispensed with and a more simple indexing mechanism of known form used in which the machine is stopped while the blank is indexed a given tooth space.

Also adjustably secured to the cylindrical block 79 are a pair of segmental arms 81, the securing means being bolts and nuts 82. The arms 81 have their lower ends adjustably secured in spaced relation to a rocker 83, as by bolts 81', the lower surface 84 of the rocker being in the form of a cone. This cone-shaped rocker 83 is adapted to roll on a horizontal plane parallel to the plane surface 85 of a bracket 86 adjustably secured as by the bolts 87 upon the cradle 59 hereinabove referred to, and slip of the rocker relative to the plane upon which it rocks is prevented by steel wires or bands 88, one of which is secured to each end of the rocker and to the bracket 86 at the opposite ends thereof. The ends of these bands 88 are adjustably held as by the means shown at 89, whereby they may be kept tight.

For the purpose of retaining the rocker 83 in place on the bracket 86 and resisting the thrusts of the cutter T that may be transferred to the rocker through the arms 81, a brace plate 90, Fig. 1, is provided on a bracket 91 which has a rocking adjustment as at 92, the adjusting movement of the bracket being effected by a screw bolt 93 and bolts 93ª.

The blank B is detachably secured to an arbor 94, and sleeve 96 as shown particularly in Fig. 4, the arbor passing through the center of the blank and being secured to it and to the sleeve as by a nut 95. The arbor 94 and sleeve 96 operate together in the blocks 76 and 79, and by the mechanism in the housing 80 hereinabove referred to, the arbor and sleeve and consequently the blank, are intermittently coupled to the block 79, whereby they partake of the movements of that block. Thus as long as the arbor is so coupled to the block 79, the blank, the arbor, the block 79, the housing 80, the arms 81, and the rocker 83, are all rigidly secured together and adapted to partake of the rocking movements of the rocker 83. In bevel gear cutting machinery, this supporting mechanism is known as the "former cone," and it is by the rocking action of this former cone that the desired tooth face is generated. In the present invention, since the machine is adapted for cutting a die for a bevel gear instead of the bevel gear itself, the arrangement of the parts is different from that in a gear-cutting machine. Thus, it will be noticed that while the plane surface 85 or the parallel plane above it on which the rocker 83 rolls, is substantially in a horizontal plane passing through the geometric center 55 of the machine, yet the plane in which the supporting plate 65 oscillates is at a considerable angle to the plane of said surface 85 and is somewhat above said center 55. Also, it will be observed that the axis of the arbor 94 extends upwardly and toward the cutting mechanism of the machine, yet not enough to be normal to the plane in which said plate 65 oscillates, whereby the tool is constantly pointed into the blank or is working on the inside of a cone instead of on the outside as in cutting bevel gears.

In Fig. 9 the completed die is illustrated in perspective. In Fig. 10, there is an edge view of the blank, and the addendum cone and the dedendum cone of the teeth to be cut are indicated at 97 and 98 respectively. Obviously, the point of the tool T in making its deepest cut, will move in a plane tangential to the dedendum cone 98, as shown somewhat in detail in Fig. 11. Of course, if this plane in which the point of the tool T operates is horizontal and tangential to the cone 98 shown in Fig. 10, then it is obvious from said Fig. 10 that that plane is clear of all other cut portions of the blank. The addendum and dedendum cones 97 and 98 are also indicated on Fig. 11 and the pitch cone is indicated at 99 on both Figs. 10 and 11.

It will be understood that since the side faces of a bevel gear are slightly convex in cross section, the side faces of the teeth of the die to be cut upon the machine shown in this invention must be slightly concave, as shown particularly in Fig. 11. For the purpose of generating this concavity into the teeth of the die to be cut, and to get the necessary clearance, the cutting edges 100 of the tools used are made slightly convex as shown in said figure. Instead of using a single cutter for both faces of the die teeth, a cutter T as shown in Fig. 11 is used to cut one face of the teeth and a tool or cutter T' shown in Fig. 12 is used to cut the other face.

It will be understood that the rolling or generating action of the blank B is obtained by oscillating the supporting plate 65 back and forth by means of the rotary shaft 73. This shaft is operated slowly through suitable worm gears 101, a shaft 102, bevel gears 103, and reducing spur gears 104, the latter being operated directly by the wheel 27 above referred to. As the plate 65 is oscillated away from the middle position in which it is shown in Fig. 2, the entire blank supporting structure rolls as a cone about the center point 55, the block 79 turning slightly on its support, and by reason of the fact that the axis of the arbor 94 is not on the axis about which the plate 65 oscillates, the arbor, and consequently the blank B, partake also of the rolling motion and the part of the blank being operated upon is caused to roll approximately on its pitch cone relatively to the tool. In Figs. 3 and 4, the blank supporting mechanism is shown in middle position, in which position of course the tool will make its deepest cut. The same is true of Fig. 1. In Figs. 5, 6, 7 and 8, however, the blank has been rolled considerably to one side, in which position the tool is cutting on the addendum part of the die teeth.

Only one form of the invention has been shown, but it will be understood that various other forms and modifications may be made without departing from the spirit or scope of the invention as set forth in the annexed claims.

Having thus described my invention, what I claim and desire to secure by Letters Patent is:—

1. In a machine of the class described, in combination, a circular blank, a cutter, and means for relatively operating the cutter and blank so that the cutter's deepest cutting point may operate substantially in a plane clear of all other cut portions of the blank, and means for producing an additional relative rolling movement of the blank and cutter to generate the desired cut surface.

2. In a machine of the class described, in combination, a circular blank, a cutter, and means for relatively operating the cutter and blank so that the cutter's deepest cutting point may operate substantially in a plane clear of all other cut portions of the blank, and means for producing a relative rolling movement of the blank and cutter to generate the desired cut surface.

3. Means for cutting teeth in bevel gear dies comprising, in combination, a holder for the die blank, a cutter having a convex cutting edge, means for moving the cutter to effect a cut in the blank, and means for producing a relative movement between the blank and cutter to generate the teeth.

4. Means for cutting teeth in bevel gear dies comprising, in combination, a holder for the die blank, a cutter having a convex cutting edge, means for moving the cutter to effect a cut in the blank, and means for rolling the blank relative to the convex cutting edge of the die to generate concave faces on the teeth.

5. In a tooth generating machine, the combination of the frame having a surface lying in a plane which passes through the geometrical center of the machine, and a cutter and operating mechanism comprising an arbor for the blank arranged with its axis cutting said plane at said center and having a former cone operating on a plane parallel to said surface, a bearing for said arbor, a support for said bearing adapted to oscillate in a path parallel to a plane at an angle to said surface plane, and means for oscillating said support in said path.

6. In a tooth generating machine, the combination of the frame having a surface lying in a plane which passes through the geometrical center of the machine, and a cutter and operating mechanism comprising an arbor for the blank arranged with its axis cutting said plane at said center and having a former cone operating on a plane parallel to said surface, a bearing for said arbor, a support for said bearing adapted to oscillate in a path parallel to a plane at an angle to said surface plane, and at an angle to the axis of rotation of said arbor, and means for oscillating said support in said path.

7. In a tooth generating machine, the combination with the frame having a surface lying in a plane which passes through the geometrical center of the machine, and a cutter and operating mechanism mounted on the frame, of a blank supporting mechanism comprising an arbor for the blank arranged with its axis cutting said plane at said center and having a former cone operating on a plane parallel to said surface, a supporting bearing for said arbor, a plate supporting said bearing and arranged to oscillate in a plane at an angle to said surface plane, and means for oscillating said plate.

8. In a tooth generating machine, the combination with the frame having a surface lying in a plane which passes through the geometrical center of the machine, and a cutter and operating mechanism mounted on the frame, of a blank supporting mechanism comprising an arbor for the blank arranged with its axis cutting said plane at said center and having a former cone operating on a plane parallel to said surface, a supporting bearing for said arbor, a plate supporting said bearing and arranged to oscillate about said center in a plane at an angle to said surface plane, and means for oscillating said plate.

9. In a tooth cutting machine, in combination, a blank holding and operating mechanism, a cutter having a convex cutting edge, means for moving the cutter, and means for producing a relative movement between the cutter and blank to generate the tooth.

10. In a machine of the class described, in combination, a supporting member, an upright arbor mounted thereon and adapted to support a blank, a rocker, arms connecting said rocker to said arbor, a cutter adapted to operate on said blank, and a brace connected to said support and acting against said rocker to resist the thrusts of the cutter.

11. In a machine of the class described, in combination, a supporting member, an upright arbor mounted thereon and adapted to support a blank, a rocker, arms connecting said rocker to said arbor, a cutter adapted to operate on said blank, and an adjustable brace connected to said support and acting against said rocker to resist the thrusts of the cutter.

12. In a machine of the class described, in combination, a supporting member, an upright arbor mounted thereon and adapted to support a blank, a rocker, arms connecting said rocker to said arbor, a cutter adapted to operate on said blank diagonally across its face, and a brace connected to said support and acting against said rocker to resist the thrusts of the cutter.

13. In a machine of the class described, in combination, a supporting member, an upright arbor, mounted thereon and adapted to support a blank, a rocker, arms connecting said rocker to said arbor, a cutter adapted to operate on said blank diagonally across its face, and a brace connected to said support and acting against the side of the rocker toward which the cutter operates to resist the thrusts of the cutter.

14. In a tooth cutting machine, in combination, a blank holding and operating mechanism, a cutter having a convex cutting edge, and means for moving the cutter in a curved path to effect a cut in the blank.

15. In a tooth cutting machine, in combination, a blank holding and operating mechanism, a cutter having a convex cutting edge, means for moving the cutter in a curved path to effect a cut in the blank, and means for producing a relative rolling movement between the cutter and blank to generate a concave tooth profile.

In testimony whereof I affix my signature.

CHARLES E. DERR.